(12) United States Patent
Kakalashvili (10) Patent No.: US 11,095,227 B2  
(45) Date of Patent: Aug. 17, 2021

(54) INTERLEAVED LLC RESONANT CONVERTER

(71) Applicant: Murata Manufacturing Co., Ltd., Nagaokakyo (JP)

(72) Inventor: Nana Kakalashvili, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/769,010

(22) PCT Filed: Dec. 20, 2018

(86) PCT No.: PCT/US2018/070003  
§ 371 (c)(1),  
(2) Date: Jun. 2, 2020

(87) PCT Pub. No.: WO2019/126831  
PCT Pub. Date: Jun. 27, 2019

(65) Prior Publication Data  
US 2021/0226547 A1      Jul. 22, 2021

Related U.S. Application Data

(60) Provisional application No. 62/609,441, filed on Dec. 22, 2017.

(51) Int. Cl.  
*H02M 3/335* (2006.01)  
*H02M 1/08* (2006.01)  
*H02M 1/00* (2006.01)

(52) U.S. Cl.  
CPC ....... *H02M 3/33592* (2013.01); *H02M 1/083* (2013.01); *H02M 1/0058* (2021.05)

(58) Field of Classification Search  
CPC ............. H02M 3/335; H02M 3/33576; H02M 3/33592; H02M 1/083; H02M 1/14;  
(Continued)

(56) References Cited

U.S. PATENT DOCUMENTS 8,629,627 B2    1/2014   Cohen et al.  
9,755,522 B2 *  9/2017   Dubus ................... H02M 3/285  
(Continued)

FOREIGN PATENT DOCUMENTS

NO      2017/049191 A1    3/2017

OTHER PUBLICATIONS

Official Communication issued in International Patent Application No. PCT/US2018/070003, dated Apr. 25, 2019.

*Primary Examiner* — Adolf D Berhane  
(74) *Attorney, Agent, or Firm* — Keating & Bennett, LLP (57) ABSTRACT

An LLC converter includes a plurality of resonant circuits that each include a plurality of capacitors connected to a DC input voltage, a switching circuit including a plurality of switches connected to the DC input voltage, a plurality of transformers each including a plurality of primary windings and a plurality of secondary windings, and a plurality of synchronous rectifiers each connected to one of the plurality of secondary windings. The plurality of primary windings of each of the plurality of transformers includes a first primary winding and a second primary winding. Series-connected first primary windings are connected to a first resonant circuit of the plurality of resonant circuits, and series-connected second primary windings are directly connected to a second resonant circuit of the plurality of resonant circuits. Currents from each of the plurality of secondary windings are equal or substantially equal.

20 Claims, 4 Drawing Sheets

(58) Field of Classification Search
CPC .... H02M 1/0058; H02M 1/34; H02M 1/0054; H02M 1/0048; H02M 7/4815; H02M 7/4826

See application file for complete search history.

(56) References Cited

U.S. PATENT DOCUMENTS

| | | | |
|---|---|---|---|
| 10,079,541 B1* | 9/2018 | Taban | H02J 7/00 |
| 10,491,123 B2* | 11/2019 | Wang | H02M 3/33576 |
| 10,686,387 B2* | 6/2020 | Kakalashvili | H02M 3/33592 |
| 10,790,081 B2* | 9/2020 | Fei | H02M 1/15 |
| 2012/0262953 A1 | 10/2012 | Jungreis et al. | |
| 2012/0275197 A1 | 11/2012 | Yan et al. | |
| 2015/0103561 A1 | 4/2015 | Dai et al. | |
| 2015/0357921 A1 | 12/2015 | Li et al. | |

* cited by examiner

Fig. 3

INTERLEAVED LLC RESONANT CONVERTER

BACKGROUND OF THE INVENTION

1. Field of the Invention

The present invention relates to LLC resonant converters. More specifically, the present invention relates to interleaved LLC resonant converters with multiple transformers and multiple rectifiers.

2. Description of the Related Art

For high-power, high-current applications, it is known to use an interleaved LLC resonant converter driven with 90° or 180° phase shift to reduce the ripple in the output current provided to the output capacitors. But, mismatches in the parasitic inductances of the transformers cause asymmetric output currents, reducing the effectiveness of the interleaved LLC resonant converter.

U.S. Patent Application Publication No. 2012/0275197 A1 discloses an interleaved LLC resonant converter that attempts to address the mismatched parasitic inductances in the transformers. However, this interleaved LLC resonant converter has the disadvantages that the integrated transformer working conditions are the same as the known non-interleaved LLC resonant converter circuits in that the integrated transformer must be designed to store a large amount of energy. This large energy capacity requires a large core volume, which results in high conductive losses in the transformer's magnetics. The losses from the synchronous rectifiers, which are typically metal-oxide-semiconductor field-effect transistors (MOSFETs), are high because the known interleaved LLC resonant converter in certain load and input voltage conditions is operated at a frequency below its resonant frequency and because the power MOSFETs or the synchronous rectifier MOSFETs are turned off when the current is not zero, i.e. under non-zero-current-switching (non-ZCS) conditions. These losses reduce the converter's efficiency when the known interleaved LLC resonant converter is operated at frequencies below its resonant frequency.

SUMMARY OF THE INVENTION

To overcome the problems described above, preferred embodiments of the present invention provide interleaved LLC resonant converters that each achieve input current ripple reduction, magnetic-flux cancelation, and increased power density. Because the same primary current flows in the primary windings of each of the transformers, the output currents in the secondary windings of each of the transformers are equal, and the secondary synchronous rectifiers are turned OFF with ZCS.

Interleaved LLC resonant converters according to the preferred embodiments of the present invention significantly reduce losses in the secondary synchronous rectifiers and provide equal current distribution among the secondary windings of the transformers. Input current ripple reduction allows the volume of the transformers to be significantly reduced, which allows for higher density. Increases in power density can be achieved even without output current ripple reduction. The increase in power density due to the reduction of the transformer volume is greater than the increase in power density due to the reduction or cancellation of the ripple current of the output capacitors. The increase in power density due to the cancelation in the magnetic flux is larger than the increase in power density due to the reduction or cancelation in the ripple current of the output capacitors. Improved efficiency is achieved, especially when operating below the resonant frequency. Because of the magnetic flux cancelation in the integrated transformer, the transformer volume is reduced in high-output-current applications, achieving a reduction in conduction losses in the secondary winding and a reduction in core losses in each transformer.

According to a preferred embodiment of the present invention, an LLC converter, that outputs a DC output voltage from a DC input voltage, includes a plurality of resonant circuits that each include a plurality of capacitors connected to the DC input voltage, a switching circuit including a plurality of switches connected to the DC input voltage, a plurality of transformers each including a plurality of primary windings and a plurality of secondary windings, and a plurality of synchronous rectifiers each connected to one of the plurality of secondary windings. The plurality of primary windings of each of the plurality of transformers includes a first primary winding and a second primary winding. The first primary windings of each of the plurality of transformers are connected in series. The second primary windings of each of the plurality of transformers are connected in series. The series-connected first primary windings are connected to a first resonant circuit of the plurality of resonant circuits. The series-connected second primary windings are directly connected to a second resonant circuit of the plurality of resonant circuits. A first current from the first resonant circuit of the plurality of resonant circuits flows into the series-connected first primary windings. A second current from the second resonant circuit of the plurality of resonant circuits flows into the series-connected second primary windings. Currents from each of the plurality of secondary windings are equal or substantially equal.

The second current is preferably phase shifted by 90° or by 180° with respect to the first current.

Preferably, the plurality of resonant circuits each include first and second capacitors of the plurality of capacitors connected in series and an inductor connected to a node between the first and second capacitors. Preferably, a first inductor of the first resonant circuit is connected in series with the series-connected first primary windings, and a second inductor of the second resonant circuit is connected in series with the series-connected second primary windings.

A number of turns in the first primary windings of each of the plurality of transformers is preferably equal. A number of turns in the second primary windings of each of the plurality of transformers is preferably equal. The LLC converter further preferably includes a control circuit that drives the plurality of switches and the plurality of synchronous rectifiers on and off. Magnetic flux in each of the plurality of transformers preferably partially cancel each other such that only energy sufficient to provide to a load is not canceled.

According to a preferred embodiment of the present invention, an LLC converter, that outputs a DC output voltage from a DC input voltage, includes first and second resonant circuits connected to the DC input voltage, a first switching circuit including a first switch including a first terminal connected to the first resonant circuit and to the DC input voltage and a second switch including a first terminal connected to the first resonant circuit, a second switching circuit including a third switch including a first terminal connected to the second resonant circuit and to the DC input voltage and a fourth switch including a first terminal connected to the second resonant circuit, first and second transformers each including first and second primary windings, and a rectification circuit connected to the first and the second transformers and to the DC output voltage. A second terminal of the first switch and a second terminal of the second switch are connected to each other and to the first primary winding of the first transformer. A second terminal of the third switch and a second terminal of the fourth switch are connected to each other and to the second primary winding of the first transformer. The first primary windings of the first and the second transformers are connected in series. The second primary windings of the first and the second transformers are connected in series. The first primary winding of the second transformer is connected to the first resonant circuit. The second primary winding of the second transformer is connected to the second resonant circuit.

Preferably, each of the first and second resonant circuits includes first and second capacitors connected in series and an inductor connected to a node between the first and second capacitors; the inductor of the first resonant circuit is connected to the first primary winding of the second transformer; and the inductor of the second resonant circuit is connected to the second primary winding of the second transformer. Currents from the first and the second secondary windings of the first and the second transformers are preferably equal or substantially equal. A turns ratio of the first primary winding of the first transformer to the first primary winding of the second transformer is preferably 1:1. A turns ratio of the second primary winding of the first transformer to the second primary winding of the second transformer is preferably 1:1. The LLC converter further preferably includes a control circuit that provides drive signals to the rectification circuit and to the first and second switching circuits.

Preferably, the rectification circuit includes first, second, third, and fourth synchronous rectifiers, and each of the first, second, third and fourth synchronous rectifiers is connected to one of the first and the second transformers. The first, second, third and fourth synchronous rectifiers are preferably switched on and off at zero current.

Magnetic flux in the first transformer and magnetic flux in the second transformer preferably partially cancel each other such that only energy sufficient to provide to a load is not canceled. Currents in the first and second resonant circuits are preferably phase shifted by 90° or by 180°.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
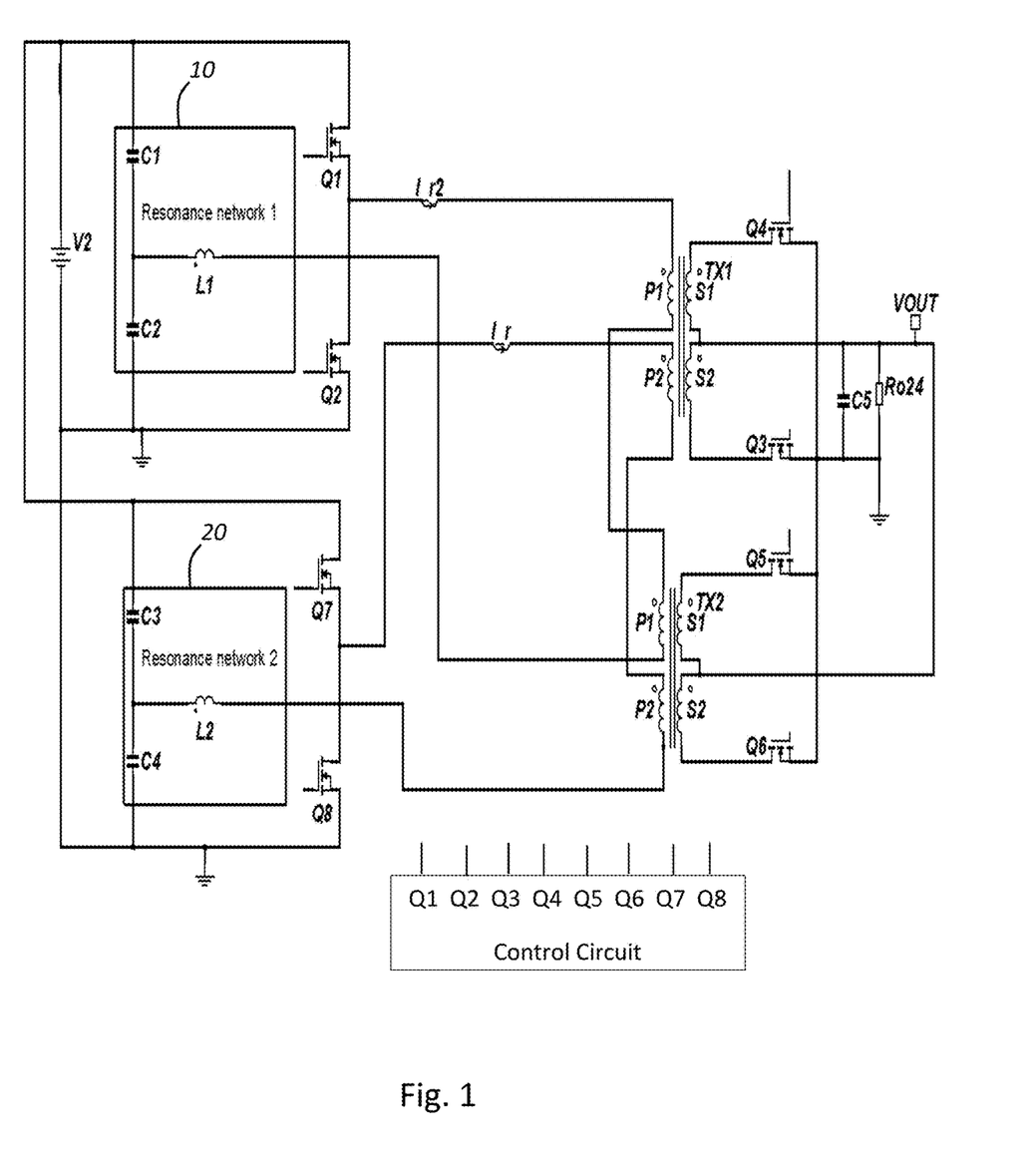
FIG. 1 is a circuit diagram of an interleaved LLC resonant converter according to a preferred embodiment of the present invention.

As shown in FIG. 1, the interleaved LLC resonant converter includes an input voltage V2, a first resonant circuit 10, a second resonant circuit 20, power switches Q1, Q2, Q7, Q8, transformers TX1, TX2, synchronous rectifiers Q3, Q4, Q5, Q6, output capacitor C5, resistor Ro24 representing the load, and output terminal Vout. The first resonant circuit 10 includes inductor L1 and capacitors C1, C2, and the second resonant circuit 20 includes inductor L2 and capacitors C3, C4. Transformers TX1, TX2 each include two primary windings P1, P2 and two secondary windings S1, S2. Turns ratio of the primary windings P1:P2 is 1:1, and the turns ratio of the secondary windings S1:S2 is 1:1. The primary windings P1, P1 of transformers TX1, TX2 are connected in series, and the primary windings P2, P2 of transformers TX1, TX2 are connected in series. The secondary windings S1, S2 of transformer TX1 are connected in series and share a node that is connected to Vout, and the secondary windings S1, S2 of transformer TX2 are connected in series and share a node that is connected to Vout. Power switches Q1, Q2 are connected in series between the input voltage V2 and ground, and power switches Q7, Q8 are connected in series between the input voltage V2 and ground.

In the first resonant circuit 10 of FIG. 1, capacitors C1, C2 are connected in series between the input voltage V2 and ground. The inductor L2 is connected between the node between the capacitors C1, C2 and the node between the power switches Q1, Q2 via the series-connected primary windings P1, P1 of transformers TX1, TX2. The current I_r2 is the resonant current through the series-connected inductor L1 and primary windings P1, P1 of the transformers TX1, TX2.

In the second resonant circuit 20 of FIG. 1, capacitors C3, C4 are connected in series between the input voltage V2 and ground. The inductor L2 is connected between the node between the capacitors C3, C4 and the node between the power switches Q7, Q8 via the series-connected secondary windings S1, S1 of transformers TX1, TX2. The current I_r is the resonant current through the series-connected inductor L2 and primary windings P2, P2 of the transformers TX1, TX2.

Power switches Q1, Q2 are included in a first switching circuit with power switches Q1, Q2 connected in series. The first switching circuit is connected to the input voltage V2 and to the first resonant circuit 10. A first terminal of the power switch Q1 is connected to a positive terminal of the input voltage V2 and to a terminal of the capacitor C1. A second terminal of the power switch Q1 is connected to a first terminal of the power switch Q2. The second terminal of the power switch Q2 is connected to ground, to a negative terminal of the input voltage V2, and to a terminal of the capacitor C2. A node between the power switches Q1, Q2 is connected to the primary winding P1 of the first transformer TX1.

Power switches Q7, Q8 are included in a second switching circuit with power switches Q7, Q8 connected in series. The second switching circuit is connected to the input voltage V2 and to the second resonant circuit 20. A first terminal of the power switch Q1 is connected to a positive terminal of the input voltage V2 and to a terminal of the capacitor C3. A second terminal of the power switch Q7 is connected to a first terminal of the power switch Q8. The second terminal of the power switch Q8 is connected to ground, a negative terminal of the input voltage V2, and a terminal of the capacitor C4. A node between the power switches Q7, Q8 is connected to the primary winding P2 of the first transformer TX1.

Synchronous rectifiers Q3, Q4, Q5, Q6 are included in a rectification circuit. Synchronous rectifier Q4 is connected to the grounded terminal of the secondary winding S1 of transformer TX1, and synchronous rectifier Q3 is connected to the grounded terminal of the secondary winding S2 of transformer TX1. Synchronous rectifier Q5 is connected to the grounded terminal of the secondary winding S1 of transformer TX2, and synchronous rectifier Q6 is connected to the grounded terminal of the secondary winding S2 of transformer TX2. Synchronous rectifiers Q3, Q4, Q5, Q6 share a node that is connected to the output capacitor C5. The output capacitor C5 is connected to the output terminal Vout and ground, and the resistor Ro24 is connected to the output terminal Vout and ground.

A control circuit drives the power switches Q1, Q2, Q7, Q8 and the synchronous rectifiers Q3, Q4, Q5, Q6 ON and OFF.

Because each transformer TX1, TX2 includes two primary windings P1, P2, the current I_r2 and the current I_r flow through each of the transformers TX1, TX2. Because of input current ripple reduction and because of magnetic-flux cancellation, transformer core losses in the transformers TX1, TX2 are reduced, which increases the output power capability with a smaller transformer volume and the power density of the interleaved LLC resonant converter. Because the same primary current flows in the primary windings P1, P2 of each of the transformers TX1, TX2, the two transformers TX1, TX2 will provide the same output currents. The output currents of the synchronous rectifiers Q3, Q4, Q5, Q6 are the superposition of the two currents I_r2 and I_r, which results in the output currents of the secondary windings S1, S2 of the transformers TX1, TX2 being equal and also results in the secondary rectifiers Q3, Q4, Q5, Q6 turning OFF with the ZCS.

Figure 2A:
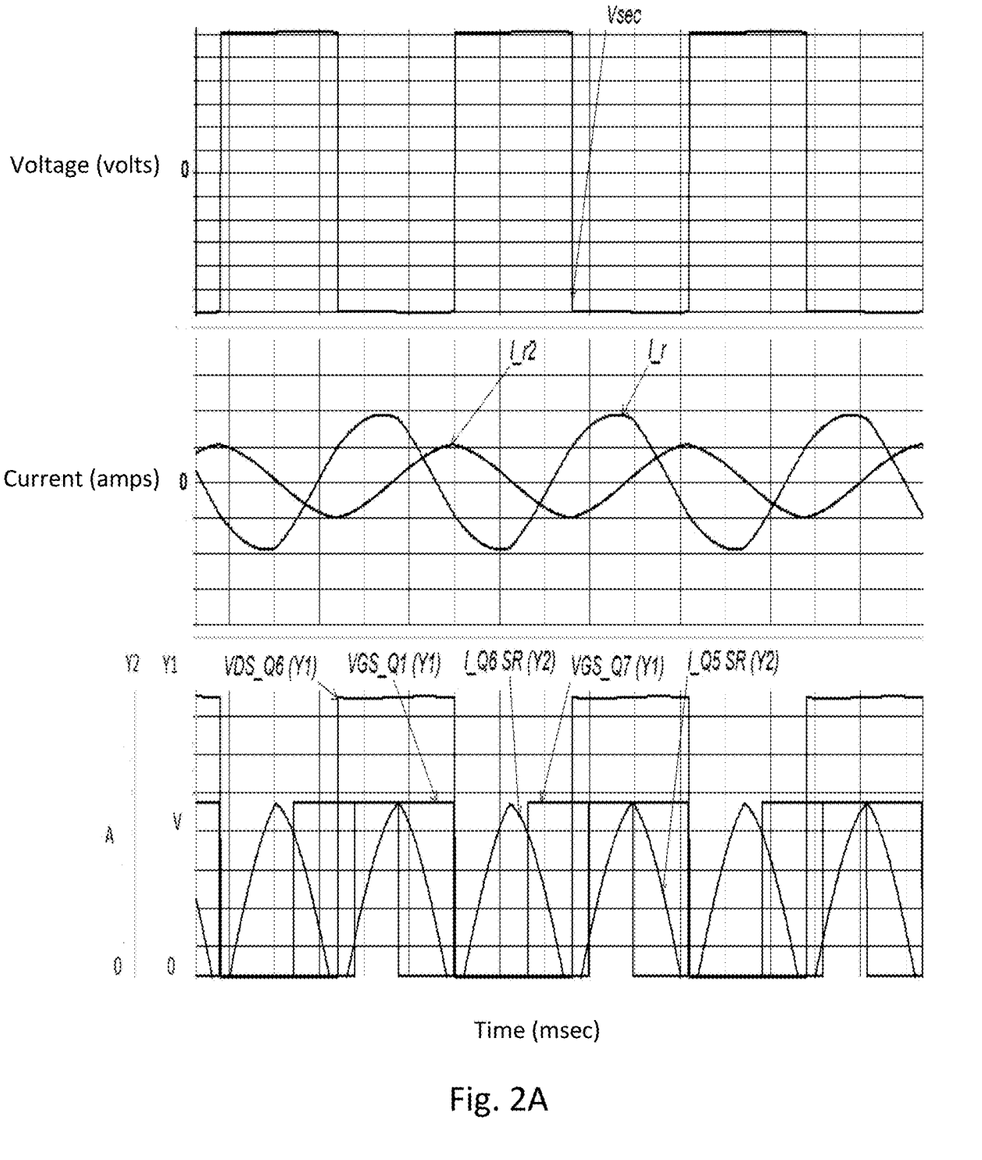
FIGS. 2A and 2B show waveforms when the two currents in the two resonant circuits in the converter shown in FIG. 1 are shifted by 90° with respect to each other.
Figure 2B:
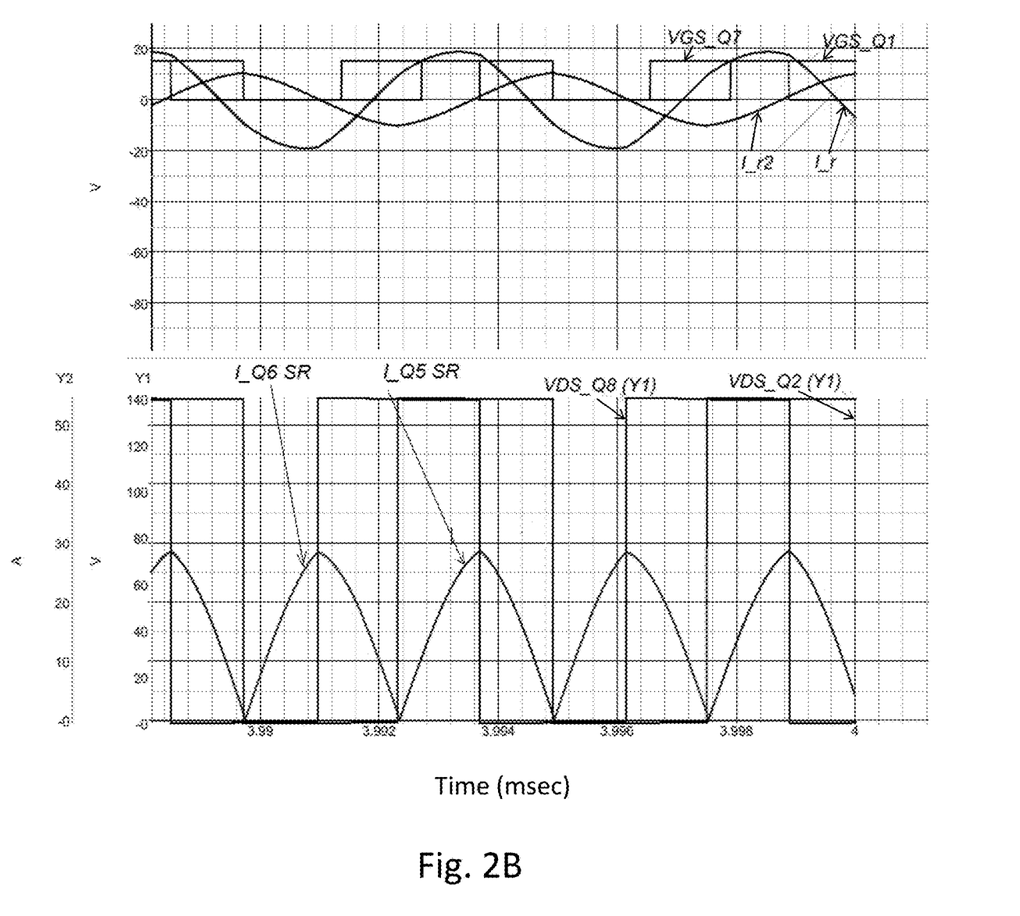
Figure 3:
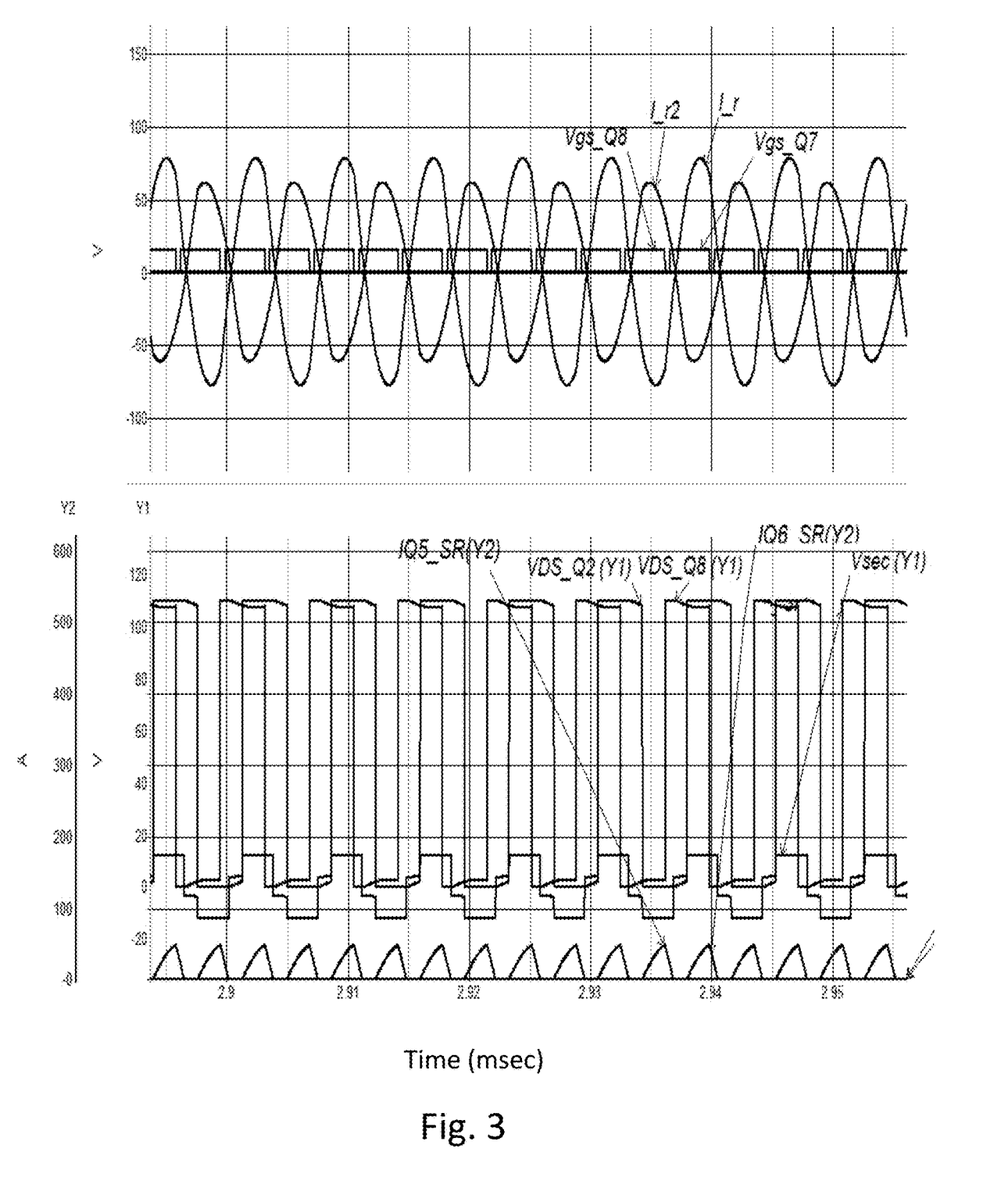
FIG. 3 shows waveforms when the two currents in the two resonant circuits in the converter shown in FIG. 1 are shifted by 180° with respect to each other.

In FIGS. 2A and 2B, current I_r2 through the first resonant circuit 10 is shifted by 90° with respect to current I_r through the second resonant circuit 20. The sum of currents I_r and I_r2 represents the input current ripple cancelation. In FIG. 3, current I_r2 through the first resonant circuit 10 is shifted by 180° with respect to current I_r through the second resonant circuit 20. The sum of currents I_r and I_r2 represents the input current ripple cancelation.

When power switch Q1 is ON, the current I_r2 flows through the primary windings P1, P1 of transformers TX1, TX2, the inductor L2, and the capacitors C1, C2. Current IQ5_SR is the source-to-drain current through synchronous rectifier Q5, and current IQ4_SR is the source-to-drain current through synchronous rectifier Q4. On the secondary side, to provide a current to the load, current IQ4_SR flows through the secondary windings S1 of the transformers TX1, and current IQ5_SR flows through the secondary windings S1 of the transformers TX2.

Power switch Q2 is operated in a complementary manner to power switch Q1 in that power switch Q2 is OFF when power switch Q1 is ON, and power switch Q2 is ON when power switch Q1 is OFF. When power switch Q2 is ON, the current I_r2 flows in the opposite direction as when power switch Q1 is ON.

FIG. 2B shows that the power switches Q1, Q2, Q7, Q8 are turned OFF with non-ZCS, i.e., when the current through the power switches Q1, Q2, Q7, Q8 is not zero. FIG. 2B shows when the interleaved LLC converter is switched at frequencies below the resonant frequency. However, the synchronous rectifiers Q3, Q4, Q5, Q6 are turned ON and OFF with ZCS, i.e., when the current through the synchronous rectifiers Q3, Q4, Q5, Q6 is zero. These switching conditions are different from the switching conditions of known interleaved LLC converters. When known interleaved LLC converters are switched at frequencies below the resonant frequency, both the power switches and the synchronous rectifiers are switched with non-ZCS.

According to preferred embodiments of the present invention, only the half-bridge power transistors are switched with non-ZCS, i.e., with hard switching, and the synchronous rectifiers are switched with ZCS when the interleaved LLC converter is operated at frequencies below the resonant frequency.

When the power switch Q7 is ON, the current I_r flows through primary windings P2, P2 of the transformers TX1, TX2, the inductor L2, and the capacitors C3, C4. Power switch Q8 is operated in an inverse manner to power switch Q7 in that power switch Q8 is OFF when power switch Q7 is ON, and power switch Q8 is ON when power switch Q7 is OFF. When power switch Q8 is ON, the current I_r flows in the opposite direction as when power switch Q7 is ON.

Power switch Q8 is turned OFF with non-ZCS when the interleaved LLC converter is switched at frequencies below the resonant frequency, which is similar to how known interleaved LLC converters are switched when operated at the frequencies below resonant frequency.

The first resonant circuit 10 operates similarly to the second resonant circuit 20 but is operated with a 90° phase shift as shown in FIGS. 2A and 2B or with a 180° phase shift as shown in FIG. 3. For example, as shown in FIGS. 2A and 2B, the gate drive voltages VGS_Q1 and VGS_Q7 are shifted by 90°. The gate drive voltages for power transistors Q2 and Q8, although not shown in FIGS. 2A and 2B, are also shifted by 90°. For the 180° phase shift shown in FIG. 3, the gate drive voltages for power transistors Q1 and Q7 and for power transistors Q2 and Q8 are shifted by 180°. In FIG. 3, the gate drive voltages VGS_Q1 and VGS_Q8 are identical, and the gate drive voltages VGS_Q2 and VGS_Q7 are identical.

The disadvantage of the 180° phase shift compared to the 90° phase shift is that the ripple current of the output capacitor C5 is greater than the ripple current of the output capacitor in a known interleaved LLC converter. FIG. 3 shows time periods when no current is flowing to the load Ro24, i.e., when both currents I_Q5_SR and I_Q6_SR are zero. However, the magnetic flux cancelation achieved by the superposition of the currents I_r2 and I_r in the transformers TX1 and TX2 is greater than the magnetic flux cancelation achieved when using the 90° phase shift.

The interleaved LLC converter using the 180° phase shift is more suitable for applications with output voltages VOUT in the range of about 48 V to about 56 V with lower load currents compared to applications with an output voltage VOUT of about 12 V but with the same output power. The interleaved LLC converter using the 90° phase shift is more suitable for applications with output voltages VOUT of about 5 V or about 12 V and with higher output load currents.

Because, when operated, the two currents I_r2 and I_r are out of phase, a portion of the magnetic flux in the transformers TX1 and TX2 is canceled, with only the energy sufficient to provide to the load not being canceled. The interleaved LLC resonant converter shown in FIG. 1 achieves more magnetic flux cancellation than known interleaved LLC resonant converters. Because of the magnetic flux cancellation, magnetic components with smaller volume can be used. Because the total magnetic flux delta is lower in the magnetics core, the transformer core losses are lower, which helps reduce the volume of the magnetics of the transformers TX1 and TX2.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An LLC converter that outputs a DC output voltage from a DC input voltage, the LLC converter comprising:
   a plurality of resonant circuits that each include a plurality of capacitors connected to the DC input voltage;
   a switching circuit including a plurality of switches connected to the DC input voltage;
   a plurality of transformers each including a plurality of primary windings and a plurality of secondary windings; and
   a plurality of synchronous rectifiers each connected to one of the plurality of secondary windings; wherein
   the plurality of primary windings of each of the plurality of transformers includes a first primary winding and a second primary winding,
   the first primary windings of each of the plurality of transformers are connected in series,
   the second primary windings of each of the plurality of transformers are connected in series,
   the series-connected first primary windings are connected to a first resonant circuit of the plurality of resonant circuits,
   the series-connected second primary windings are directly connected to a second resonant circuit of the plurality of resonant circuits,
   a first current from the first resonant circuit of the plurality of resonant circuits flows into the series-connected first primary windings,
   a second current from the second resonant circuit of the plurality of resonant circuits flows into the series-connected second primary windings, and
   currents from each of the plurality of secondary windings are equal or substantially equal.

2. The LLC converter of claim 1, wherein the second current is phase shifted by 90° with respect to the first current.

3. The LLC converter of claim 1, wherein the second current is phase shifted by 180° with respect to the first current.

4. The LLC converter of claim 1, wherein:
   the plurality of resonant circuits each include:
      first and second capacitors of the plurality of capacitors connected in series; and
      an inductor connected to a node between the first and second capacitors.

5. The LLC converter of claim 4, wherein
   a first inductor of the first resonant circuit is connected in series with the series-connected first primary windings, and
   a second inductor of the second resonant circuit is connected in series with the series-connected second primary windings.

6. The LLC converter of claim 1, wherein a number of turns in the first primary windings of each of the plurality of transformers is equal.

7. The LLC converter of claim 1, wherein a number of turns in the second primary windings of each of the plurality of transformers is equal.

8. The LLC converter of claim 1, further comprising a control circuit that drives the plurality of switches and the plurality of synchronous rectifiers on and off.

9. The LLC converter of claim 1, wherein magnetic flux in each of the plurality of transformers partially cancel each other such that only energy sufficient to provide to a load is not canceled.

10. An LLC converter that outputs a DC output voltage from a DC input voltage, the LLC converter comprising:
    first and second resonant circuits connected to the DC input voltage;
    a first switching circuit including:
       a first switch including a first terminal connected to the first resonant circuit and to the DC input voltage; and
       a second switch including a first terminal connected to the first resonant circuit;
    a second switching circuit including:
       a third switch including a first terminal connected to the second resonant circuit and to the DC input voltage; and
       a fourth switch including a first terminal connected to the second resonant circuit;
    first and second transformers each including first and second primary windings; and
    a rectification circuit connected to the first and the second transformers and to the DC output voltage; wherein
    a second terminal of the first switch and a second terminal of the second switch are connected to each other and to the first primary winding of the first transformer,
    a second terminal of the third switch and a second terminal of the fourth switch are connected to each other and to the second primary winding of the first transformer,
    the first primary windings of the first and the second transformers are connected in series,
    the second primary windings of the first and the second transformers are connected in series,
    the first primary winding of the second transformer is connected to the first resonant circuit, and
    the second primary winding of the second transformer is connected to the second resonant circuit.

11. The LLC converter of claim 10, wherein:
    each of the first and second resonant circuits includes:
       first and second capacitors connected in series; and
       an inductor connected to a node between the first and second capacitors;
    the inductor of the first resonant circuit is connected to the first primary winding of the second transformer, and
    the inductor of the second resonant circuit is connected to the second primary winding of the second transformer.

12. The LLC converter of claim 10, wherein currents from the first and the second secondary windings of the first and the second transformers are equal or substantially equal.

13. The LLC converter of claim 10, wherein a turns ratio of the first primary winding of the first transformer to the first primary winding of the second transformer is 1:1.

14. The LLC converter of claim 10, wherein a turns ratio of the second primary winding of the first transformer to the second primary winding of the second transformer is 1:1.

15. The LLC converter of claim 10, further comprising a control circuit that provides drive signals to the rectification circuit and to the first and second switching circuits.

16. The LLC converter of claim 10, wherein:
    the rectification circuit includes first, second, third, and fourth synchronous rectifiers, and
    each of the first, second, third and fourth synchronous rectifiers is connected to one of the first and the second transformers.

17. The LLC converter of claim 16, wherein the first, second, third and fourth synchronous rectifiers are switched on and off at zero current.

18. The LLC converter of claim 10, wherein magnetic flux in the first transformer and magnetic flux in the second transformer partially cancel each other such that only energy sufficient to provide to a load is not canceled.

19. The LLC converter of claim 10, wherein currents in the first and second resonant circuits are phase shifted by 90°.

20. The LLC converter of claim 10, wherein currents in the first and second resonant circuits are phase shifted by 180°.

* * * * *